March 7, 1933.   J. M. MEREDITH   1,900,835
TIRE AND RIM CONSTRUCTION
Filed April 29, 1931
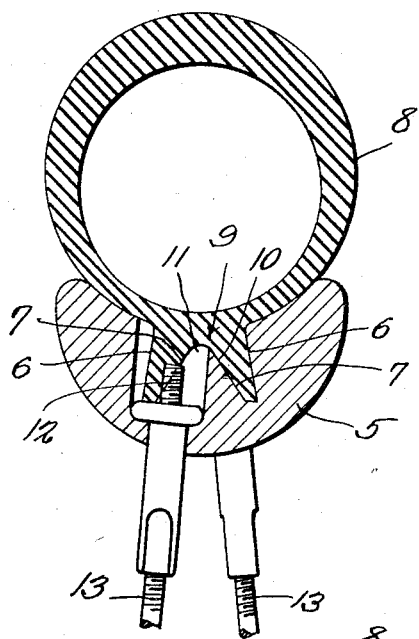
Fig.1.
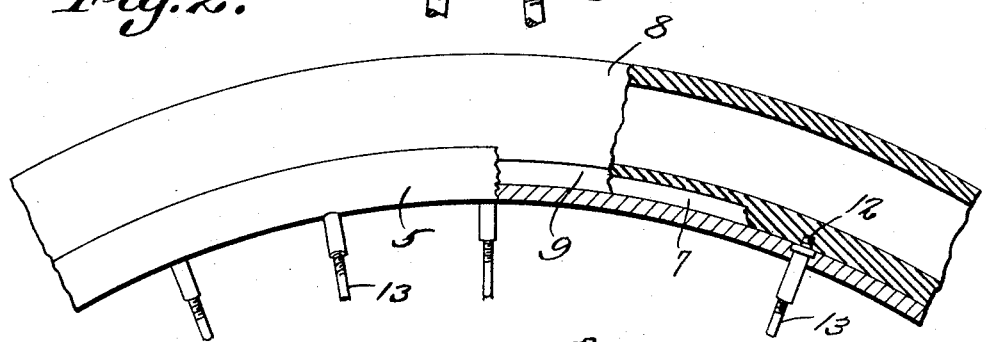
Fig.2.
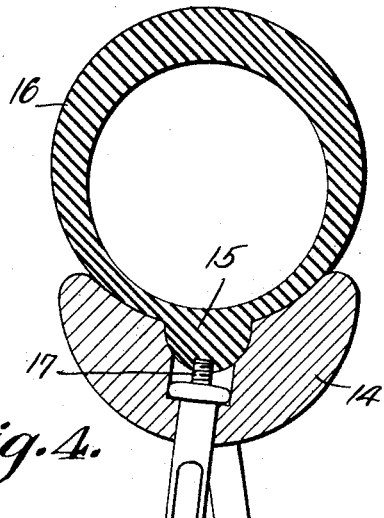
Fig.3.
Fig.4.
Inventor
J. M. Meredith
By C. A. Snow & Co.
Attorneys.

Patented Mar. 7, 1933

1,900,835

UNITED STATES PATENT OFFICE

JAQUELIN M. MEREDITH, OF NORFOLK, VIRGINIA, ASSIGNOR OF ONE-FOURTH TO B. F. YOST, OF NORFOLK, VIRGINIA

TIRE AND RIM CONSTRUCTION

Application filed April 29, 1931. Serial No. 533,812.

This invention relates to bicycle tire and rim construction, the primary object of the invention being to provide means for causing a binding action between the tire and rim, to securely hold the tire on the rim in such a manner as to insure against the tire creeping on its rim, to damage the valve stem.

An important object of the invention is to provide a rim having grooves constructed to accommodate annular ribs formed on the tire, the ribs being movable laterally to grip the walls of the grooves, when the tire is expanded under air pressure.

A still further object of the invention is to provide enlargements on the tire in which the ends of the spokes may embed themselves, to securely lock the tire in position on the rim.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a sectional view through a tire and rim constructed in accordance with the invention.

Figure 2 is a fragmental elevational view partly in section, illustrating a tire and rim.

Figure 3 is a fragmental sectional view showing the tire prior to the positioning of the tire on the rim.

Figure 4 is a sectional view through a modified form of the invention.

Referring to the drawing in detail, the reference character 5 designates the rim of a bicycle wheel, which is formed with the usual grooved periphery, in which the tire is mounted.

As clearly shown by Figure 3 of the drawing, the base of the peripheral groove of the rim is formed with spaced grooves 6, the outer walls thereof being slightly inclined towards the center of the rim, while the inner walls 7 of the grooves are inclined in the same direction, but at greater degrees.

The reference character 8 designates the tire which is provided with an integral enlargement or rib 9 which is of a width to fit between the outer walls of the grooves 6 formed in the rim.

A groove 10 is formed in the enlargement 9 defining ribs 9' and providing a clearance for the central portion 11 of the tire rim, which is provided by the formation of the grooves 6. It will of course be understood that these grooves 6 are of depths to extend appreciable distances within the rim, to the end that the protruding ends 12 of the spokes 13, that form a part of the wheel, may embed themselves in the enlargement or ribs 9', to further insure against creeping of the tire on the rim.

Due to the construction shown and described, it will be obvious that when pressure is directed to the tire as by inflation, the ribs 9' are forced laterally within the grooves 6, setting up a binding action between the ribs 9' and outer walls of the grooves 6, to prevent slipping or creeping of the tire on its rim.

In the form of the invention as illustrated by Figure 4 of the drawing, the rim which is indicated by the reference character 14 is formed with a groove disposed at a point intermediate its width, and provided in the periphery thereof, the groove being curved to accommodate the annular rib or enlargement 15 which is formed of rubber and made integral with the tire, which is indicated by the reference character 16. This rib or enlargement 15 is of a length to extend to a point within the rim, where it will be engaged by the ends 17 of the spokes 18, the ends 17 embedding themselves in the rib or enlargement 15, to anchor the tire against movement on the rim.

I claim:

A bicycle tire and rim comprising a rim section having continuous grooves formed therein, the outer walls of the grooves being outwardly inclined, the inner walls of the grooves being inwardly inclined and forming a central rib, wide, spaced, continuous ribs formed on the tire, said ribs having substantially straight outer surfaces and inclined inner surfaces conforming to the shape of the central rib of the rim section, and said ribs of the tire extending laterally within the grooves, setting up a binding action between the ribs and walls of the grooves, under pressure directed thereto caused by inflating the tire.

In testimony that I claim the foregoing as my own, I have hereto affixed my signature.

JAQUELIN M. MEREDITH.